Figure 2:

(No Model.) 2 Sheets—Sheet 1.

W. & G. H. SELLERS.
ART OF UPSETTING METAL.

No. 276,291. Patented Apr. 24, 1883.

Witnesses:

Inventors:
Wm Sellers
Geo. H. Sellers (No Model.) 2 Sheets—Sheet 2.
W. & G. H. SELLERS.
ART OF UPSETTING METAL.
No. 276,291. Patented Apr. 24, 1883.
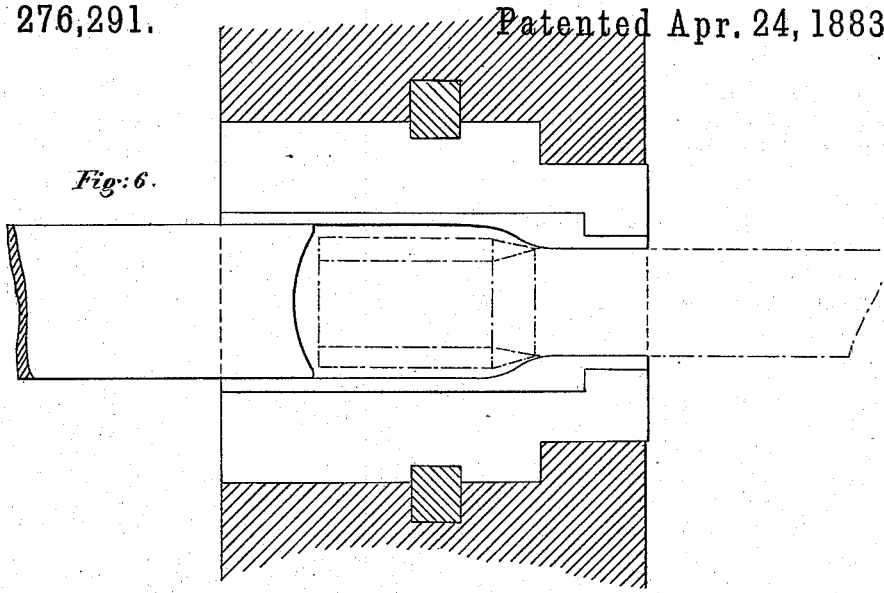
Fig: 6.
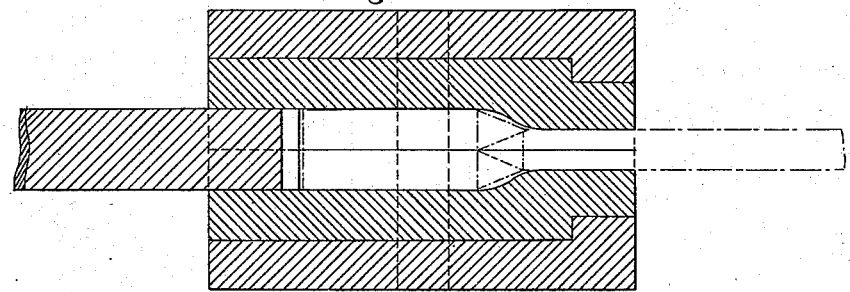
Fig: 7.
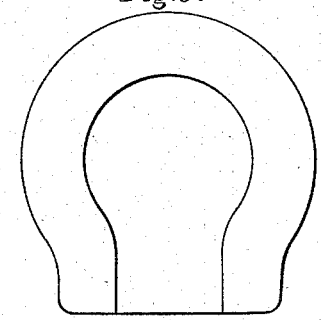
Fig. 9.
Fig. 10.
Witnesses.
Inventors:
Wm Sellers
Geo. H. Sellers.

UNITED STATES PATENT OFFICE.

WILLIAM SELLERS, OF PHILADELPHIA, PENNSYLVANIA, AND GEORGE H. SELLERS, OF WILMINGTON, DELAWARE; SAID GEORGE H. SELLERS ASSIGNOR TO JOHN SELLERS, JR., OF PHILADELPHIA, PENNSYLVANIA.

ART OF UPSETTING METAL.

SPECIFICATION forming part of Letters Patent No. 276,291, dated April 24, 1883.

Application filed April 10, 1882. (No model.)

*To all whom it may concern:*

Be it known that we, WILLIAM SELLERS, of the city and county of Philadelphia, in the State of Pennsylvania, and GEORGE H. SELLERS, of Wilmington, in the county of New Castle and State of Delaware, having jointly invented a new and useful Improvement in the Art of Upsetting and Shaping Metal, of which improvement the following is a specification.

Our invention relates to that method of upsetting and shaping metal required to form eye-bars for bridges and analogous structures. In the manufacture of such eye-bars from square or flat bars the eye is always made as thick as or thicker than the bar; but when made from round bars the eye is usually much thinner than the diameter of the bar, so that in the former case the eye must be formed by first thickening and spreading the bar; but in the latter case the bar may require to be spread only where the eye is to be formed, and this enlarged part is then flattened in a finishing-die of the desired shape. Heretofore this enlarged part of a bar, of whatever form, has always been produced by thickening and spreading, and when this has been effected by upsetting alone it is requisite that the bar shall be very much upset to provide the necessary material for the final flattening and shaping pressure, and in so doing a difficulty presents itself in the upsetting which is not developed in the ordinary upsetting to provide for waste only—that is to say, this excessive upsetting has only been obtained at the expense of the continuity of the metal through the upset. The thickening and spreading of such bars have heretofore been effected in several ways—as, for example, if the bar is rectangular, by inserting a sufficient length of the bar in a die having the requisite depth and width, or, if the bar is round, in a die having a spherical form and suitable diameter, and applying sufficient pressure to fill such die by upsetting the bar therein. The cross-section of such dies must be much greater than that of the bar, to permit the requisite thickening of the bar at the same time that it is spread within the die, and the upsetting-pressure upon the metal softened by heat causes it to bend in the direction of least resistance until confined by the die, first on one side and then on the other, so that the upset is formed with sinuous foldings. These foldings inclose the cinder, which it is impossible afterward to expel by the welding heat and pressure to which this upset is subjected in the final shaping process, and the continuity of the metal is consequently destroyed, the weld is therefore imperfect, and the finish and strength of the eye are impaired. To remedy this difficulty the bar has been piled, and placed thus piled and at a welding-heat between dies, which, by closing, compressed and welded the pile together and at the same time reduced it to the required thickness. Then, without opening the dies, the welded pile in the dies was subjected to a second pressure, (at right angles to the closing pressure,) which upset the metal and at the same time spread it laterally to the desired width. Another method frequently employed consists in first partially upsetting the bar to provide for the waste in subsequent heating and welding, and then piling it with sufficient metal to enable the welding and flattening operations to spread it to the desired shape. The method first described is defective, as already mentioned, by reason of the sinuous folds, which with such method cannot be avoided, and on the line of which the eye will break before the bar, if pulled to destruction, and the piling and upsetting processes are defective, by reason of the nicety required in locating the line of welding, which also required its area to be carefully proportioned to the size of the eye to give the eye sufficient strength to break the bar, and there was always a source of danger in the liability of the workman to produce an imperfect weld. The processes above described are defective as described when employed upon iron, but are inadmissable upon steel, as it is not desirable nor expedient to subject steel to a welding-heat, and even at this heat a sufficiently perfect weld is practically unattainable.

The object of our improvement is to thicken or to spread or to thicken and spread round, square, or flat bars of metal, whether of iron or steel, by upsetting, and to effect this upsetting to any desired extent without bending the bar, so as to form sinuous folds, and without any piling or welding. This process requires such modifications in its applications as are due, first, to the shape of the bar to be treated; and, second, to the extent of the upsetting operations upon that part of the bar which is to be treated. Thus, for a bar which has to be thickened and spread and then shaped the treatment is different from that applied to a bar which is to be simply spread and shaped without being thickened. We shall therefore describe our invention in its several adaptations to these purposes, respectively, all involving the same principle and being dependent upon the same conditions, which constitute our improvement. In our pursuit of this object we have discovered that where the bar requires thickening as well as spreading the thickening and the spreading operations must be successive instead of simultaneous; and our invention consists in thickening or in spreading the bar, as the case may be, by supporting so much of the bar as is to be operated upon in three or more lines and upsetting it while so supported; and it further consists in upsetting and shaping the bar by supporting so much of it as is to be operated upon in three or more lines, and thickening it by upsetting it while so supported, then supporting this thickened part on opposite sides and spreading it by upsetting it while so supported, and then shaping this enlarged part by flattening it within a die which has the desired outline; and it further consists of a clamping thickening-die provided with beveled sides, which sides clamp the flat or square bar on its corners and support it throughout the length of the die; and it further consists of a spreading-die, which supports the bar in three or more lines throughout the length of the die.

Figure 1:
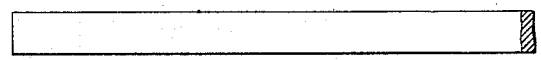
Figure 4:
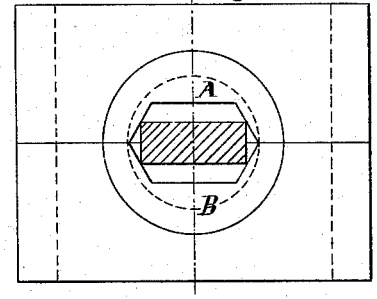
Figure 8:
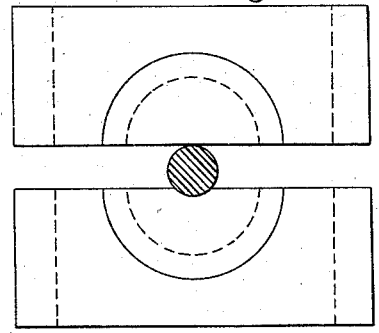
Figure 3:
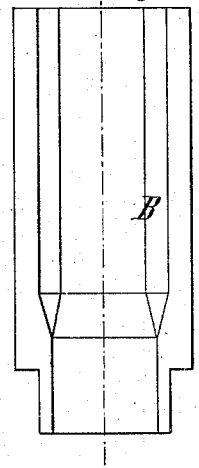
Figure 5:
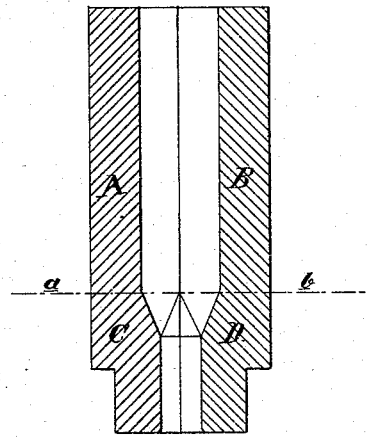

In the accompanying drawings, which make part of this specification, Figure 1 is a side elevation of a rectangular bar, and Fig. 2 is an end view of the same. Fig. 3 is a plan of one-half of the upsetting thickening die for such a bar. Fig. 4 is an end view of the two halves of this die, showing in section the bar in position for upsetting and thickening. Fig. 5 is a longitudinal vertical section of the two halves of this die. Fig. 6 is a plan of one-half of the upsetting spreading-die, showing by dotted lines the position of the thickened bar. Fig. 7 is a longitudinal vertical section of the two halves of this spreading-die. Fig. 8 is an end elevation of the spreading-dies for a round bar, showing in section such bar in position between the dies. Fig. 9 is a plan of the finishing or shaping die, and Fig. 10 a vertical longitudinal section of the same.

The dies are to be placed in and operated successively by a screw, lever, or other powerful press, from which they and the upsetting-bar may receive the required movements; but as showing the best means by which we contemplate practicing our improved process we refer to a patent, No. 178,966, dated June 20, 1876, granted to George H. Sellers, for improvement in machines for welding, upsetting, and shaping iron, and inasmuch as the construction and operation of such dies are well understood and their required movements are the same by whatever means effected it is unnecessary to give any further detailed descriptios herein further than to point out that our upsetting process may be practiced in such a machine when the bar is to be thickened and spread by inserting the thickening-dies with their corresponding upsetting-bar for the first operation, after the completion of which these dies and their bar must be replaced by the spreading-dies and their corresponding bar for the second upsetting operation, or, when the size of the work will admit of it, both sets of dies may be in place—one over the other—at the same time; but in this case the dies must be so arranged that they can be raised and lowered and the upsetting-bars changed accordingly, or the bar to be operated upon must be raised and lowered, so that the upsetting operations may be performed consecutively instead of simultaneously, as heretofore. After the bar has been thus upset and thickened and spread or widened it is then transferred to the shaping-dies, in which it is flattened to the desired outline by pressure in the ordinary way. In the absence of an adequate press these operations may be effected by means of steam-hammers arranged for the purpose, as is well understood.

The beveled sides of the clamping thickening-dies A and B for flat bars, Figs. 3, 4, and 5, are represented as divided longitudinally, for convenience in removing the thickened bar; but they may be divided transversely at the end of the parallel portion of the enlargement shown by the dotted line $a\,b$. That portion, C D, of these dies next the upsetting-ram may be made in one piece, and the other end only be divided longitudinally, so that when these latter are separated the thickened bar may be pushed out by the upsetting-ram. In this case the solid portion C D may be round, or any other shape that will support the corners of the bar; but with this part of the die solid any material change in the size of the bar to be thickened would require a different size of die. This change of dies is unnecessary when the beveled clamping-dies are employed, as with these the thickness of the bar may vary from what would pass into the dies freely when closed to a thickness such that the closing of the clamping-dies would not curve its cross-section by their lateral compression.

The spreading-dies for round bars shown in Fig. 8 are provided with a shallow groove, the shape of which is immaterial, provided only that it embraces the bar, as shown, so as to prevent the bar from bending laterally under the upsetting-pressure. A very slight groove is sufficient for this purpose, and this groove may be in both the upper and lower die, or in either the one or the other. We have shown it in the lower die only. When an eye is to be formed upon a round bar, and such eye is required to be as thick as or thicker than the diameter of the bar, it is preferable to increase the diameter of or thicken the bar where the eye is to be formed before it is spread, although these operations may be reversed; and to this end the part to be thickened may be inserted in a cylindrical die of the required diameter, providing this is not so large as to permit folding, and then upset so as to fill this die, after which it may be spread to the desired extent in the spreading-die shown in Fig. 8, the groove in which will prevent it from bending laterally; but when a large preliminary upset for thickening is required the first die should be square in place of round, because the sides of the square die may approach the bar as closely as the inner side of the cylindrical die first described, to prevent foldings, while the corners of the square die afford additional room in which the metal will flow under the upsetting-pressure. After the bar has been upset in the square die it may be transferred to a spreading-die, similar to that shown in Fig. 8, to be spread to the width required for the final flattening and shaping pressure. In the case last described the spreading-dies shown in Fig. 8 should be provided with a V-shaped groove in both the upper and lower die, which grooves will prevent the thickened part from bending laterally under the upsetting spreading-pressure. Where an eye is to be formed upon a square bar that part of the bar where the eye is to be formed should be upset in a round die, which will support the bar on its corners against folding, and this round upset should then be transferred to the spreading-die shown in Fig. 8, which will prevent the thickened part from bending laterally under the upsetting spreading-pressure.

In spreading the thickened part of a flat bar such as hereinbefore described it is not necessary to make provision against lateral bending in the upsetting spreading operation, because the width of the bar itself is sufficient for this purpose. So, likewise, in the case of round or square bars, if the preliminary thickened upset is sufficient to permit the upsetting spreading-dies to spread the thickened part by their closing pressure, the width of this flattened upset may be sufficient to prevent lateral bending, and in such case the groove in the spreading-die would not be required.

In our improved method of thickening a bar and then shaping, or spreading and shaping it, a particular outline for the thickened part is not important in the first stage of the process. It is important only at this stage that the mass of metal within the required length shall be sufficient for the subsequent operations, (and that there shall be no sinuous foldings such as are hereinbefore referred to,) since these operations will cause the metal to flow into the desired relations with the other parts of the bar, and consequently in many cases, with rectangular bars, it will be sufficient to support the bar upon its edges in V-shaped jaws or guides, as will be understood by reference to Fig. 4, where the dies A and B, if cut away so as to leave nothing but their beveled sides, would represent such guides. The guides, however, would each be made in one piece, and may be arranged to move toward or from each other to accommodate different widths of bars, the end of the plunger being concave, as shown in Fig. 6, but with the axis of the concavity in the plane of the guides.

The essential feature of the first stages of our improved process being the successive in place of the simultaneous operations of thickening and spreading, and the essential feature of the thickening operation being the support of the bar during this operation, we accordingly contemplate practicing our improved process without using our improved dies, as shown and described, as they are not essential to the process, though particularly adapted for special classes of work. In all cases the part of the bar to be operated upon must, at each successive step of the process, be at or reheated to a proper temperature for the next following operation.

By this process of upsetting and then shaping we are enabled not only to make eye-bars of iron without foldings, or piling and welding, and without the defects incident thereto, but we can make eye-bars of steel equally free from defects, and with all the superior qualities of that metal, and we can, moreover, by this process upset both iron and steel bars to any extent required for purposes other than the manufacture of eye-bars.

Having thus described the objects and nature of our invention, what we claim as new, and desire to secure by Letters Patent, is—

1. The hereinbefore-described improvement in the art of upsetting metal bars without piling and without folding, which consists in first heating so much of the bar as is to be operated upon to the requisite temperature, then supporting this heated part in three or more lines, and then upsetting it while so supported, substantially as and for the purposes set forth.

2. The hereinbefore-described improvement in the art of upsetting and shaping metal bars without piling and without folding, which consists in first heating so much of the bar as is to be operated upon to the requisite temperature, then supporting this heated part in three or more lines, and thickening it by upsetting it while so supported, then supporting this thickened part on opposite sides and spreading it by upsetting it while so supported, and then shaping this enlarged part by flattening it within a die which has the desired outline, substantially as described.

3. The hereinbefore-described clamping thickening-die, provided with beveled sides, which sides clamp the bar on its corners and support it throughout the length of the die, substantially as and for the purposes set forth.

4. The hereinbefore-described spreading-die, which supports the bar or its upset in three or more lines, substantially as and for the purposes set forth.

WM. SELLERS.
GEO. H. SELLERS.

Witnesses:
H. H. CAMPBELL,
WM. A. SMITH.